United States Patent Office 2,840,601
Patented June 24, 1958

2,840,601

PREPARATION OF 2-HYDROXY-2-PHENYL-ETHANE-SULFONIC ACID AND SALTS

Frederick H. Norton, Concord, Calif., assignor to The Dow Chemical Company, Midland, Mich., a corporation of Delaware No Drawing. Application June 26, 1957
Serial No. 668,028

6 Claims. (Cl. 260—512)

This invention pertains to the preparation of 2-hydroxy-2-phenylethanesulfonic acid and its salts, and particularly to an improved method wherein styrene oxide is reacted with alkali bisulfite salts.

2-hydroxy-2-phenylethanesulfonic acid is a known compound having established utility in the preparation of detergents, wetting agents, herbicides, and other useful products. It is known, as reported by Kharasch et al., Journal of the American Chemical Society, vol. 61, page 3092 (1939) to prepare 2-hydroxy-2-phenylethanesulfonic acid by reaction of styrene and alkali bisulfites in the presence of oxygen. However, the yield of this product was low. Furthermore, the product was contaminated with 2-phenylethanesulfonic acid and 2-phenylethylene-sulfonic acid, and required extensive purification, resulting in further loss of product.

It is among the objects of this invention to provide a convenient method for the preparation of 2-hydroxy-2-phenylethanesulfonic acid and its salts in good yield and purity.

A particular object is to provide such a method wherein 2-hydroxy-2-phenylethanesulfonic acid is obtained from styrene oxide and alkali bisulfites.

Other objects and advantages of the invention will be evident in the following description.

It has now been discovered that salts of 2-hydroxy-2-phenylethanesulfonic acid can be obtained by reacting styrene oxide with alkali bisulfites in an aqueous medium.

It has been reported by Schenck et al. in the Journal of the American Chemical Society, vol. 75, page 1636 (1953), that the reaction between styrene oxide and sodium bisulfite produced only sodium 2-hydroxy-1-phenyl-ethanesulfonate; the authors state that "no other addition product could be isolated."

It has now been discovered, and the discovery forms the basis of the present invention, that salts of 2-hydroxy-2-phenylethanesulfonic acid are obtained when styrene oxide and alkali bisulfites are interacted in an aqueous medium at temperatures above 60° C., e. g. from 60° to 150° C., preferably from 75° to 105° C. At reaction temperatures above 60° C., good quality 2-hydroxy-2-phenyl-ethanesulfonic acid salts are obtained in good yield. At reaction temperatures appreciably below 60° C., the principal product is 2-hydroxy-1-phenylethanesulfonic acid salts as described in the published literature.

In the present method, the starting bisulfite salt can be any water-soluble bisulfite salt of a base-forming cation such as an alkali metal bisulfite, e. g. sodium bisulfite or potassium bisulfite, calcium bisulfite, ammonium bisulfite, or an amine bisulfite, thereby forming the corresponding cation salt of 2-hydroxy-2-phenylethanesulfonic acid, e. g. the sodium, potassium, calcium, ammonium, or amine salt of such acid.

The method of the invention is practiced by preparing a water solution, preferably a concentrated solution, of the starting water-soluble bisulfite salt in an amount corresponding to from 0.5 to 1.5, preferably from 1.0 to 1.1, weight-moles thereof per weight-mole of styrene oxide to be reacted therewith. The resulting water solution of the bisulfite salt is then heated to the desired reaction temperature above 60° C., preferably in a reactor arranged for agitation of its contents. Although the reaction can be carried out under any obtainable pressure, it is conveniently carried out at atmospheric pressure and under reflux.

To the aqueous bisulfite salt solution at a reaction temperature above 60° C. and preferably with agitation is then fed styrene oxide. The resulting reaction is exothermic, and the styrene oxide is preferably fed at a rate at which the temperature of the resulting reaction mixture can readily be controlled. Preferably, one weight-mole of styrene oxide is mixed and reacted with an approximately equimolar proportion, e. g. from 1.0 to 1.1 weight-moles, of the bisulfite salt.

After complete commingling of the styrene oxide and the bisulfite salt solution, the resulting reaction mixture is kept hot until at least one of the reactants, e. g. the styrene oxide, is substantially consumed.

The resulting reaction product comprises the 2-hydroxy-2-phenylethanesulfonic acid salt of the cation corresponding to the starting bisulfite salt. The salt product can be obtained from the reaction mixture by evaporation of water therefrom. A substantially pure 2-hydroxy-2-phenylethanesulfonic acid salt can be obtained from the aqueous reaction mixture by crystallization, e. g. by cooling the concentrated aqueous solution, and collecting the resulting crystalline product, e. g. by filtration. Further crops of crystals can then be obtained from the resulting mother-liquor. Further purification of the 2-hydroxy-2-phenylethanesulfonic acid salts can be obtained by recrystallization thereof, e. g. from aqueous alcohol.

The 2-hydroxy-2-phenylethanesulfonic acid salts can be converted to the free acid form by metathetical reaction with an equivalent amount of strong mineral acid such as hydrochloric or sulfuric acid. A preferred method for making a salt-free form of 2-hydroxy-2-phenylethanesulfonic acid is one in which a water solution of a salt, e. g. a sodium salt, of the acid is treated with a strongly acidic cation exchange resin in the hydrogen ion form, such as a sulfonated cross-linked polystyrene cation exchange resin.

The 2-hydroxy-2-phenylethanesulfonic acid can be converted to salt forms by reaction in usual ways with base-acting materials such as metals, metal oxides, metal hydroxides, metal salts of weak acids, ammonia, ammonium salts of weak acids, amines, and the like.

The following examples illustrate the invention, but are not to be construed as limiting its scope.

Example 1

To 400 ml. of water in a reactor fitted with a stirrer and reflux condenser there was added 220 grams of sodium bisulfite. The mixture was heated to 80° C. To the resulting hot solution and with agitation, there was slowly added 240 grams of styrene oxide while maintaining the temperature of the resulting reaction mixture in the range from 75° to 85° C. When the styrene oxide addition was complete, the resulting mixture was heated in the same range of from 75° to 85° C. under reflux for one hour.

The resulting reaction mixture was cooled in an ice bath, whereupon a precipitate of crystalline sodium 2-hydroxy-2-phenylethanesulfonate formed. This crystalline precipitate was collected on a filter to obtain 368 grams of product. This product was recrystallized from aqueous 70 percent by weight ethanol to obtain 313 grams of pure sodium 2-hydroxy-2-phenylethanesulfonate. A portion of this product was analyzed with the following results (in percent by weight):

|  | Found | Calculated for $C_6H_5CHOHCH_2SO_3Na$ |
|---|---|---|
| Sulfur | 14.5 | 14.3 |
| Sodium | 10.1 | 10.3 |

The S-benzylisothiouronium salt was made according to Schenck et al., J. Am. Chem. Soc. 75, 1641 (1953):
Melting point, found: 149.5–150° C.
Melting point, reported for salt of
$C_6H_5CHOHCH_2SO_3H$: 148.5–149.5° C.

*Example 2*

A cation exchange resin column of Dowex 50, a sulfonated crosslinked copolymer of styrene and divinylbenzene manufactured by the Dow Chemical Company, was treated with 3 N hydrochloric acid and washed with water to put the ion-exchange groups into the hydrogen form.

Through the resulting acidic resin column was passed a water solution of sodium 2-hydroxy-2-phenylethanesulfonate prepared as in Example 1. There was thereby obtained as an effluent from the cation exchange column a salt-free aqueous solution of 2-hydroxy-2-phenylethanesulfonic acid. Evaporation of this solution under vacuum produced a syrupy residue consisting essentially of the 2-hydroxy-2-phenylethanesulfonic acid containing only a small proportion of water.

That which is claimed is:

1. A method of preparing a salt of 2-hydroxy-2-phenylethanesulfonic acid which comprises reacting styrene oxide and a water-soluble bisulfite salt in aqueous solution at a temperature above 60° C.

2. The method of claim 1 wherein the water-soluble bisulfite salt is sodium bisulfite.

3. The method of claim 1 wherein the temperature is in the range from 75° to 105° C.

4. The method of claim 1 which comprises the further step of contacting the resulting aqueous solution of the 2-hydroxy-2-phenylethanesulfonic acid salt with a strongly acid cation exchange resin in the hydrogen ion form, thereby obtaining an aqueous solution of 2-hydroxy-2-phenylethanesulfonic acid.

5. A method of preparing a salt of 2-hydroxy-2-phenylethanesulfonic acid which comprises mixing and reacting approximately equimolar quantities of styrene oxide and a water-soluble bisulfite salt in aqueous solution at temperatures in the range from 75° to 105° C.

6. The method of claim 5 wherein the water-soluble bisulfite salt is sodium bisulfite.

No references cited.